US012617192B2

(12) United States Patent
Nakaya et al.

(10) Patent No.: US 12,617,192 B2
(45) Date of Patent: May 5, 2026

(54) LIGHT- AND HEAT-SHIELDING COMPOSITE SHEET AND FIBER PRODUCT

(71) Applicants: TORAY INDUSTRIES, INC., Tokyo (JP); KOMATSU MATERE Co., Ltd., Nomi (JP)

(72) Inventors: Yohei Nakaya, Tokyo (JP); Tatsuo Hasegawa, Tokyo (JP); Masakatsu Nishihara, Ishikawa (JP); Koji Sawada, Ishikawa (JP)

(73) Assignees: TORAY INDUSTRIES, INC., Tokyo (JP); KOMATSU MATERE CO., LTD., Nomi (JP)

( * ) Notice: Subject to any disclaimer, the term of this patent is extended or adjusted under 35 U.S.C. 154(b) by 1055 days.

(21) Appl. No.: 17/762,510

(22) PCT Filed: Oct. 1, 2020

(86) PCT No.: PCT/JP2020/037444
§ 371 (c)(1),
(2) Date: Mar. 22, 2022

(87) PCT Pub. No.: WO2021/066103
PCT Pub. Date: Apr. 8, 2021

(65) Prior Publication Data
US 2022/0339916 A1 Oct. 27, 2022

(30) Foreign Application Priority Data
Oct. 1, 2019 (JP) ................................. 2019-181594

(51) Int. Cl.
| B32B 27/12 | (2006.01) |
| B32B 7/12 | (2006.01) |
| B32B 27/40 | (2006.01) |

(52) U.S. Cl.
CPC ................ B32B 27/12 (2013.01); B32B 7/12 (2013.01); B32B 27/40 (2013.01);
(Continued)

(58) Field of Classification Search
CPC ........... B32B 27/12; B32B 7/12; B32B 27/40; B32B 2250/02; B32B 2264/1022;
(Continued)

(56) References Cited

U.S. PATENT DOCUMENTS

| 5,494,735 A | 2/1996 | Nitta |
| 10,011,097 B2 | 7/2018 | Maruyama et al. |
| 2016/0096348 A1 | 4/2016 | Maruyama et al. |
| 2020/0224364 A1 | 7/2020 | Togashi et al. |

FOREIGN PATENT DOCUMENTS

| CN | 1118742 A | 3/1996 |
| CN | 1606497 A | 4/2005 |

(Continued)

OTHER PUBLICATIONS

Machine translation of JP 2007-325757 A (Year: 2007).*

(Continued)

*Primary Examiner* — Callie E Shosho
*Assistant Examiner* — Steven A Rice
(74) *Attorney, Agent, or Firm* — Birch, Stewart, Kolasch & Birch, LLP

(57) ABSTRACT

A light- and heat-shielding composite sheet includes: a fiber cloth; at least one layer of a synthetic resin film containing carbon black at a rate of 4% to 40% by mass both inclusive; and a synthetic resin adhesive containing titanium dioxide at a rate of 30% to 60% by mass both inclusive and bonding the fiber cloth with the synthetic resin film.

7 Claims, 2 Drawing Sheets

(52) U.S. Cl.
CPC ... *B32B 2250/02* (2013.01); *B32B 2264/1022* (2020.08); *B32B 2307/306* (2013.01); *B32B 2307/42* (2013.01); *B32B 2307/718* (2013.01); *B32B 2307/732* (2013.01)

(58) Field of Classification Search
CPC .......... B32B 2307/306; B32B 2307/42; B32B 2307/718; B32B 2307/732; B32B 2262/16; B32B 2255/10; B32B 2262/0276; B32B 2307/406; B32B 2307/41; B32B 5/026; B32B 2255/26; B32B 5/024; B32B 27/18; B32B 5/02; B32B 27/20; B32B 7/023; B32B 7/027; B32B 2262/106; B32B 2307/304
USPC ...................................................... 428/423.1
See application file for complete search history.

(56) References Cited

FOREIGN PATENT DOCUMENTS

| CN | 105228821 | A | | 1/2016 | |
| CN | 107921758 | A | | 4/2018 | |
| CN | 110249084 | A | | 9/2019 | |
| EP | 1 457 311 | A1 | | 9/2004 | |
| JP | H09302587 | A | * | 11/1997 | |
| JP | 2001-121639 | A | | 5/2001 | |
| JP | 2002-242085 | A | | 8/2002 | |
| JP | 2004-122568 | A | | 4/2004 | |
| JP | 2007-325757 | A | | 12/2007 | |
| JP | 2008-115488 | A | | 5/2008 | |
| JP | 2011-56072 | A | | 3/2011 | |
| JP | 2013-31929 | A | | 2/2013 | |
| JP | 2019-181804 | A | | 10/2019 | |
| WO | WO 2014/185440 | A1 | | 11/2014 | |
| WO | WO-2017047461 | A1 | * | 3/2017 | ............ A41D 31/00 |

OTHER PUBLICATIONS

Machine translation of JP H09-302587 A (Year: 1997).*
Chinese Office Action and Search Report for Chinese Application No. 202080067726.0, dated Sep. 20, 2023, with English translation.
International Search Report, issued in PCT/JP2020/037444, PCT/ISA/210, dated Nov. 10, 2020.
Written Opinion of the International Searching Authority, issued in PCT/JP2020/037444, PCT/ISA/237, dated Nov. 10, 2020.

* cited by examiner

LIGHT- AND HEAT-SHIELDING COMPOSITE SHEET AND FIBER PRODUCT

FIELD

The present invention relates to a light- and heat-shielding composite sheet and a fiber product.

BACKGROUND

In recent years, due to global warming and ozone layer depletion, there have been the increases in the number of heat stroke due to extreme heat in the summer, the effect of a harmful ultraviolet ray (UV-B) contained in sunlight on the ecosystem, and the effect on the human body such as a skin cancer and a lowered immune function. In order to solve these problems, there is a growing demand for sunshade materials such as a parasol and a tent having improved light- and heat-shielding properties.

Conventionally, a high-density woven fiber cloth dyed in black has been used as the fiber product for sunshade such as a parasol, but there has been a problem in that this cannot sufficiently shield an ultraviolet ray, a visible ray, and an infrared ray contained in the sunlight.

For this reason, materials coated with a resin containing a functional agent such as titanium dioxide and black pigment, which have UV- and heat-shielding functions, are increasingly used on the surface of an umbrella cloth (see Patent Literature 1 and Patent Literature 2). A material has also been proposed in which the surface side thereof is formed of a light-colored resin sheet that is laminated with a dark-colored resin sheet so that the sunlight passing through from the surface side may be reflected at the ground surface and the incident light is absorbed on the back of the umbrella cloth (see Patent Literature 3). Furthermore, a multilayer sheet for sunshade has been proposed in which a synthetic resin film containing a predetermined percentage of titanium dioxide and a synthetic resin film containing a predetermined percentage of carbon black are laminated to a fiber cloth by an adhesive (see Patent Literature 4).

CITATION LIST

Patent Literature

Patent Literature 1: Japanese Patent Application Laid-open No. 2007-325757
Patent Literature 2: Japanese Patent Application Laid-open No. 2008-115488
Patent Literature 3: Japanese Patent Application Laid-open No. 2011-56072
Patent Literature 4: International Publication No. 2014/185440

SUMMARY

Technical Problem

However, it is difficult to completely shield the ultraviolet and infrared rays with the coating materials of Patent Literatures 1 and 2 because not only the amount of the additive needs to be controlled in a level that does not impair the coating properties of the resin, but also the film thickness cannot be made thick; thus, sufficient light- and heat-shielding properties cannot be obtained.

In addition, simply making the back side darker, as in Patent Literature 3, does not provide a sufficient cooling effect because it does not completely cut off the ultraviolet and infrared rays.

On the other hand, the multilayered sheets for sunshade in Patent Literature 4 have excellent light-shielding and cooling effects. However, in recent years, a light-shielding material such as a parasol has been required to have not only functionalities such as light-shielding and cooling effects, but also color and design features; but Patent Literatures 1 to 4 do not pay attention at all to the color of the fiber cloth to be used.

The present invention was made in light of the above; thus, an object thereof is to provide a light- and heat-shielding composite sheet and a fiber product that have not only excellent light- and heat-shielding properties, but also excellent coloration.

Solution to Problem

To solve the problem described above and to achieve the object, a light- and heat-shielding composite sheet according to the present invention includes: a fiber cloth; at least one layer of a synthetic resin film containing carbon black at a rate of 4% to 40% by mass both inclusive; and a synthetic resin adhesive containing titanium dioxide at a rate of 30, to 60% by mass both inclusive and bonding the fiber cloth with the synthetic resin film.

In the light- and heat-shielding composite sheet according to the present invention, a brightness (L-value) of a surface of the fiber cloth is 95% or more of a brightness (L-value) of the fiber cloth alone without being bonded with the synthetic resin film.

In the light- and heat-shielding composite sheet according to the present invention, the synthetic resin film includes a polyurethane resin and has a thickness of 10 μm to 30 μm both inclusive.

In the light- and heat-shielding composite sheet according to the present invention, a dry application amount of the synthetic resin adhesive is 30 g/m² to 60 g/m² both inclusive.

In the light- and heat-shielding composite sheet according to the present invention, a light-shielding property according to JIS L1055 A method is 99.9% or more.

In the light- and heat-shielding composite sheet according to the present invention, wherein 7.7.7 heat-shielding index of JUPA standard is 40 or more.

A fiber product according to the present invention uses any one of the above-mentioned light- and heat-shielding composite sheets.

Advantageous Effects of Invention

The light- and heat-shielding composite sheet and the fiber product according to the present invention have excellent light- and heat-shielding properties as well as excellent brightness and coloration.

DESCRIPTION OF EMBODIMENTS

Hereinafter, the embodiment in which the present invention is implemented (hereinafter this is called the "implementation embodiment") will be described with reference to the attached drawings. Note that the drawings are only schematic.

Figure 1:
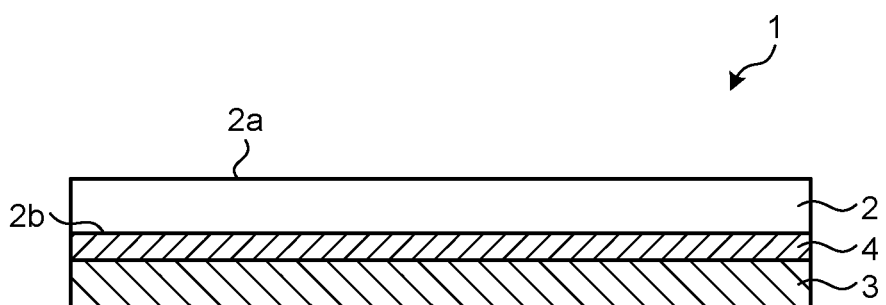
FIG. 1 is a section of the light- and heat-shielding composite sheet according to one implementation embodiment of the present invention.

FIG. 1 is a section of a light- and heat-shielding composite sheet according to one implementation embodiment of the present invention. A light- and heat-shielding composite sheet 1 according to the present invention has a fiber cloth 2, a synthetic resin film 3 containing carbon black at a rate of 4% to 40% by mass both inclusive, and titanium dioxide at a rate of 30, to 60% by mass both inclusive, and is provided with a synthetic resin adhesive 4 to bond the fiber cloth 2 with the synthetic resin film 3. The synthetic resin film 3 is bonded to a back side 2b of the fiber cloth 2 by the synthetic resin adhesive 4. A surface 2a of the fiber cloth 2 is the surface to be irradiated by sunlight. The light- and heat-shielding composite sheet 1 illustrated in FIG. 1 is provided with one layer of the synthetic resin film 3, but not limited to this; so, this may be provided with two or more layers of the synthetic resin film.

For example, the fiber cloth 2 can be made of a natural fiber such as cotton and silk, or a recycled fiber such as rayon; or the fiber cloth can be a synthetic fiber multifilament that is knitted or woven. In the present invention, it is preferable to use the synthetic fiber multifilament, which has excellent durability and processability.

Illustrative examples of the synthetic multifilament preferably used in the fiber cloth 2 include synthetic fibers including polyamide fibers typically represented by nylon 6 and nylon 66, polyester fibers such as polyethylene terephthalate, polytrimethylene terephthalate, and polybutylene terephthalate, and biodegradable fibers such as polylactic acid fiber.

As for the sectional shape of the monofilament unit, various different shaped sectional yarns, for example, round, triangular, octagonal, flat and Y-shaped, can also be used. In addition, a core-sheath or a side-by-side composite yarn consisting of polymers having, for example, different viscosities, can also be used.

In the fiber cloth 2, a temporary twist-processed yarn can be preferably used. A high-density weaving or knitting using the pre-twisted yarn further improves the light-shielding property due to the crimping effect of the pre-twisted yarns.

The yarn fineness (total fineness) used for the fiber cloth 2 can also be selected to achieve the appropriate fiber cloth weight (weight per square meter) in accordance with the application thereof. For example, for an umbrella fabric, this is preferably 20 to 180 dtex both inclusive. When the yarn fineness (total fineness) is less than 20 dtex, it is difficult to obtain sufficient strength and light-shielding property, and when the yarn fineness is more than 180 dtex, the fiber cloth 2 tends to be heavy. The yarn fineness (total fineness) is more preferably 30 to 170 dtex both inclusive. As for the monofilament, the fineness thereof is preferably 0.5 dtex to 8 dtex both inclusive. The number of filaments in the multifilament is preferably 6 to 144.

When the fiber cloth 2 is a woven fabric, the coverage factor of the fabric is preferably 1,300 to 2,800 both inclusive in order to obtain the light-shielding property. More preferably, this is 1,500 to 2,600 both inclusive.

The coverage factor here is defined by the following formula.

$$\text{Fabric coverage factor} = A \times D_A^{1/2} + B \times D_B^{1/2}$$

A: Warp yarn density of the fabric (pcs/2.54 cm)
B: Weft yarn density of the fabric (pcs/2.54 cm)
$D_A$: Total fineness of warp yarn (dtex)
$D_B$: Total fineness of weft yarn (dtex)

When the fiber cloth is a knitted fabric, the product of the number of loops per inch (2.54 cm) in the wale direction and the number of loops per inch in the course direction is preferably 1,000 to 90,000 both inclusive, while more preferably 2,000 to 8,000 both inclusive.

In the woven and knitted fiber cloth 2, when the density (coverage factor or number of loops per square inch) is below the range described above, the fiber cloth 2 is coarse and it is difficult to obtain the effective light-shielding property, and when the density is above the range described above, it tends to cause the fiber cloth 2 to be heavy.

The synthetic resin film 3 contains carbon black at a rate of 4% to 40% by mass both inclusive. By having the synthetic resin film 3 containing carbon black, the light-shielding property of the light- and heat-shielding composite sheet 1 is improved, and the light reflected from road and other surfaces can also be absorbed, thereby further reducing the irradiated amount of sunlight on the side of the synthetic resin film 3, resulting in improvement in the heat-shielding property. When the carbon black content is less than 4% by mass, sufficient light- and heat-shielding properties cannot be obtained. When the carbon black content is more than 40% by mass, film formation is inferior, causing tears and other quality defects.

Illustrative examples of the synthetic resin constituting the synthetic resin film 3 include the rubbers such as natural rubber, isoprene rubber, butadiene rubber, styrene-butadiene rubber, butyl rubber, ethylene-propylene rubber, an ethylene-vinyl acetate copolymer, chloroprene rubber, chlorosulfonated polyethylene, chlorinated polyethylene, epichlorohydrin rubber, nitrile rubber, nitrile isoprene rubber, acrylic rubber, urethane rubber, polysulfide rubber, silicone rubber, and a fluoroelastomer, as well as a vinyl chloride resin, a polyurethane resin, a polyolefin resin, and a thermoplastic elastomer. The synthetic resin film 3 is preferably formed from a polyurethane resin.

Various additives such as a vulcanization aid, a vulcanization accelerator, an anti-aging agent, a filler, a processing aid, a softener, an antistatic agent, a plasticizer, a stabilizer, an antioxidant, and a colorant can also be added to the synthetic resin film 3 as needed.

The thickness of the synthetic resin film 3 can be controlled as appropriate in accordance with the application, but in general, the thickness is preferably 10 to 30 μm. A too large thickness of the synthetic resin film 3 results in problems in that the manufacturing cost increases and the masses of the synthetic resin film 3 and the entire light- and heat-shielding composite sheet 1 also increase. On the other hand, when the synthetic resin film 3 is too thin, this tends to fail to obtain a sufficient light-shielding property.

The synthetic resin adhesive 4 contains titanium dioxide at a rate of 30 to 60% by mass both inclusive and bonds the fiber cloth 2 with the synthetic resin film 3. By blending titanium dioxide with the synthetic resin adhesive 4, the light- and heat-shielding properties are improved, and the brightness (L-value) of the surface of the fiber cloth 2 can be retained, so that the light- and heat-shielding composite sheet 1 having excellent coloration can be obtained. When the content of titanium dioxide is less than 30% by mass, the light- and heat-shielding properties cannot be obtained, and the coloration of the fiber cloth 2 is also deteriorated. When the titanium dioxide content is more than 60% by mass, the peel strength between the fiber cloth 2 and the synthetic resin film 3 decreases. In addition to titanium dioxide, metal particles such as aluminum or alumina, which have a solar reflective effect, may be added to the synthetic resin adhesive.

Known binder resins may be used as the synthetic resin that constitutes the synthetic resin adhesive 4; illustrative examples thereof include a urethane resin, an acrylic resin, a polyester resin, a silicone resin, a vinyl chloride resin, and a polyamide resin.

The dry application amount of the synthetic resin adhesive 4 is preferably 30 g/m² to 60 g/m² both inclusive. When the dry application amount of the synthetic resin adhesive 4 is less than 30 g/m², there is a risk that the peel strength decreases, sufficient light- and heat-shielding properties are not obtained, and the coloration of the fiber cloth is deteriorated. When the dry application amount of the synthetic resin adhesive 4 is more than 60 g/m², the overall mass of the light- and heat-shielding composite sheet 1 increases.

The light- and heat-shielding composite sheet 1 according to the present invention can be manufactured by applying a predetermined amount of the synthetic resin adhesive 4 onto the synthetic resin film 3, laminating the fiber cloth 2 on the side on which the synthetic resin adhesive 4 is applied, and then laminating and integrating the sheets by using a laminating machine. The synthetic resin adhesive 4 may be applied on the fiber cloth 2. Because the synthetic resin adhesive containing titanium dioxide enters between the fibers of the fiber cloth 2 by lamination and integration, the light- and heat-shielding composite sheet 1 can effectively reduce the deterioration of coloration of the fiber cloth 2.

Figure 2:
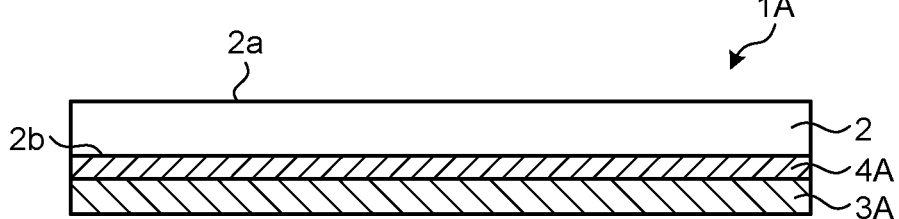
FIG. 2 is a section of the light- and heat-shielding composite sheet according to the conventional technology.
Figure 3:
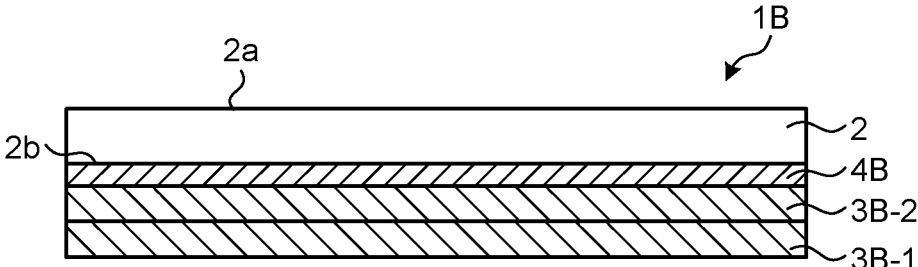
FIG. 3 is a section of the light- and heat-shielding composite sheet according to the conventional technology.

FIG. 2 and FIG. 3 are the sections of the light- and heat-shielding composite sheets according to the conventional technology. The light- and heat-shielding composite sheet 1A illustrated in FIG. 2 has the fiber cloth 2, a synthetic resin film 3A that contains titanium dioxide, and a transparent synthetic resin adhesive 4A that does not contain titanium dioxide and bonds the fiber cloth 2 with the synthetic resin film 3A. The light- and heat-shielding composite sheet 1B illustrated in FIG. 3 has the fiber cloth 2, a synthetic resin film 3B-1 containing carbon black, a synthetic resin film 3B-2 that contains titanium dioxide, and a transparent synthetic resin adhesive 4B that does not contain titanium dioxide and bonds the fiber cloth 2 with the synthetic resin films 3B-1 and 3B-2.

As can be seen in FIG. 2 and FIG. 3, in the heat- and light-shielding composite sheet 1A and the light- and heat-shielding composite sheet 1B according to the conventional technology, the fiber cloth 2 and the synthetic resin film 3A or the synthetic resin films 3B-1 and 3B-2 are laminated together by using the transparent synthetic resin adhesive 4A or 4B that does not contain titanium dioxide.

The heat- and light-shielding composite sheet 1A and the light- and heat-shielding composite sheet 1B have high light- and heat-shielding properties because they have the synthetic resin film 3A or the synthetic resin film 3B-2 containing titanium dioxide. However, because there is a transparent synthetic resin adhesive 4A between the fiber cloth 2 and the synthetic resin film 3A or 3B-2 containing titanium dioxide, the brightness of the side of the surface 2a of the fiber cloth 2 is decreased.

In contrast, the light- and heat-shielding composite sheet 1 according to the present invention bonds the fiber cloth 2 with the synthetic resin film 3 by using the white synthetic resin adhesive 4 containing titanium dioxide, so that the decrease in the brightness of the surface 2a of the fiber cloth 2 can be suppressed.

In addition, because in the light- and heat-shielding composite sheet 1 according to the present invention, the synthetic resin adhesive 4 contains titanium dioxide, the light- and heat-shielding properties can be improved without the need for a synthetic resin film containing titanium dioxide; thus, the manufacturing process and cost can be reduced. Furthermore, because of the reduction of the synthetic resin film, the mass of the light- and heat-shielding composite sheet 1 can be reduced as well.

In the light- and heat-shielding composite sheet 1 according to the present invention, a brightness (L-value) of the surface 2a of the fiber cloth 2 is 95% or more of the brightness (L-value) of the fiber cloth 2 alone without being bonded with the synthetic resin film 3. When the brightness (L-value) of the surface 2a of the fiber cloth 2 is 95% or more of the brightness (L-value) of the fiber cloth 2 alone, the light- and heat-shielding composite sheet 1 having excellent coloration can be obtained.

Preferably the light- and heat-shielding composite sheet 1 has the light-shielding property of 99.9% or more according to the JIS L1055 A method. A light- and heat-shielding sheet 1 having an excellent light-shielding property can be obtained when the light-shielding property according to the JIS L1055 A method is 99.9% or more.

Preferably the light- and heat-shielding composite sheet 1 has 40 or more in the heat-shielding index 7.7.7 of the JUPA standard. When the heat-shielding index 7.7.7 of the JUPA standard is 40 or more, the light- and heat-shielding composite sheet 1 having an excellent heat shielding property can be obtained.

The light- and heat-shielding composite sheet 1 according to the present invention has high light- and heat-shielding properties and excellent coloration, so that this can be used for fiber products such as a parasol, a tent, a curtain, a sportswear, an outdoor wear, a work cloth, a hat, and a sunshade sheet.

EXAMPLES

Examples and Comparative Examples of the present invention are described below, but the present invention is not limited by them. The evaluation items, methods, and materials used are described below.

(1) Brightness (L-Value)

The brightness (L value) of the surface 2a of the fiber cloth 2 of the sample was measured by using an image spectrophotometer (KURABO COLOR-7x, manufactured by Kurabo Industries, Ltd.) with a D65 light source. The brightness was evaluated by measuring the brightness (L value) of the fiber cloth 2 alone (base cloth) without being bonded with the synthetic resin film 3, followed by calculating the percentage of the brightness (L value) against the base cloth. The measurement is performed for each color of the fiber cloth 2, i.e., white, red, yellow, green, cream, and light blue.

(2) Light-Shielding Rate (%)

This was measured in accordance with the JIS L1055 A method (2003 edition).

(3) Heat-Shielding Index

This was measured in accordance with the 7.7.7 heat-shielding index of the JUPA standard.

Example 1

The synthetic resin film was produced by a general dry manufacturing method. Specifically, an ester-based polyurethane resin was dissolved in dimethylformamide; and then, carbon black was mixed at a rate of 6% by mass relative to the total mass of the polyurethane resin and the carbon black to obtain a polyurethane resin composition. The polyurethane resin composition was coated onto release paper and then dried at 120° C. to evaporate the solvent. After the solvent was evaporated, a black synthetic resin film made of a polyurethane resin was produced by peeling off from the release paper. The thickness of this synthetic resin film was 13 μm.

Then, titanium dioxide was added to the ester-based polyurethane resin adhesive at a rate of 35% by mass relative to the total mass of the polyurethane resin adhesive and titanium dioxide; and then, they were mixed until uniformly dispersed to obtain a white synthetic resin adhesive. The synthetic resin adhesive thus obtained was applied to a synthetic resin film with a dry application amount of 45 g/m², and dried at 120° C. to evaporate the solvent; and then, after the solvent was evaporated, a polyester temporary twisted rip taffeta (Tetoron 30d, manufactured by Toray Industries, Inc.) fiber cloth was laminated and integrated by using a laminating machine to produce a light- and heat-shielding composite sheet. The light- and heat-shielding composite sheets were prepared for each color of the fiber cloth. Table 1 lists measurement results of the brightness (L-value), the light-shielding property, and the heat-shielding index of the light- and heat-shielding composite sheets thereby obtained.

Comparative Example 1

A light- and heat-shielding composite sheet was prepared in the same manner as in Example 1, except that the black synthetic resin film used in Example 1 was bonded with the fiber cloth by using a polyurethane resin adhesive that did not contain titanium dioxide. The light- and heat-shielding composite sheets were prepared for each color of the fiber cloth. Table 1 lists measurement results of the brightness (L-value), the light-shielding property, and the heat-shielding index of the light- and heat-shielding composite sheets thereby obtained.

Comparative Example 2

Polyurethane resin was dissolved in dimethylformamide, and titanium dioxide was blended at a rate of 20% by mass relative to the total mass of the polyurethane resin and titanium dioxide to obtain a polyurethane resin composition. The polyurethane resin composition was coated onto the black synthetic resin film before peeled off from the release paper used in Example 1, then this was dried at 120° C. to evaporate the solvent; and then after the solvent was evaporated, the film was peeled off from the release paper to produce a synthetic resin film made of polyurethane resin having a white layer laminated on the black layer. The total thickness of the synthetic resin film, the white and black synthetic resin film layers, was 25 μm.

Then, the light- and heat-shielding composite sheet was obtained in the same manner as in Example 1, except that a polyurethane resin adhesive without titanium dioxide was used to bond the fiber cloth with the white side of the aforementioned synthetic resin film facing each other. The light- and heat-shielding composite sheets were prepared for each color of the fiber cloth. Table 1 lists measurement results of the brightness (L-value), the light-shielding property, and the heat-shielding index of the light- and heat-shielding composite sheets thereby obtained.

Comparative Example 3

The light- and heat-shielding composite sheet was prepared in the same manner as in Comparative Example 2, except that the content of titanium dioxide in the white synthetic resin film used in Comparative Example 2 was set to 40% by mass. The light- and heat-shielding composite sheets were prepared for each color of the fiber cloth. Table 1 lists measurement results of the brightness (L-value), the light-shielding property, and the heat-shielding index of the light- and heat-shielding composite sheets thereby obtained.

TABLE 1

| | | Blank | Example 1 | Comparative Example 1 | Comparative Example 2 | Comparative Example 3 |
|---|---|---|---|---|---|---|
| Constitution | Fiber cloth | Polyester temporary twisted rip taffeta | | | | |
| | Adhesive | — | White (Containing titanium oxide) | Transparent | Transparent | Transparent |
| | Synthetic resin film 1 | — | Black synthetic resin film (Containing carbon black) | Black synthetic resin film (Containing carbon black) | White synthetic resin film (Containing titanium oxide) | White synthetic resin film (Containing titanium oxide) |
| | Synthetic resin film 2 | — | — | — | Black synthetic resin film (Containing carbon black) | Black synthetic resin film (Containing carbon black) |
| Brightness (L value) | White | 94.9 | 90.3 (95.4%) | 58.9 (64.0%) | 85.0 (90.1%) | 85.2 (90.3%) |
| | Red | 47.9 | 46.9 (99.0%) | 36.4 (88.5%) | 44.4 (96.5%) | 43.9 (96.0%) |
| | Yellow | 88.7 | 86.6 (97.9%) | 57.5 (68.8%) | 81 (92.3%) | 79.6 (90.9%) |
| | Green | 76.8 | 73.8 (97.0%) | 52.8 (76.0%) | 70.2 (93.4%) | 69.9 (93.1%) |

TABLE 1-continued

|  | Blank | Example 1 | Comparative Example 1 | Comparative Example 2 | Comparative Example 3 |
|---|---|---|---|---|---|
| Cream | 92.6 | 90.6 (98.0%) | 59.6 (67.0%) | 85.5 (92.9%) | 83.0 (90.4%) |
| Light blue | 61.4 | 58.9 (97.5%) | 45.0 (83.6%) | 56.9 (95.5%) | 55.1 (93.7%) |
| Light-shielding property (JIS L1055 A method) |  | 99.999% | 99.994% | 99.998% | 99.999% |
| Heat-shielding index (7.7.7 JUPA standard) |  | 41.9 | 15.6 | 34.1 | 33.9 |

As can be indicated in Table 1, the light- and heat-shielding composite sheet according to the present invention, which uses the white synthetic resin adhesive, was confirmed to have superior coloration with a suppressed decrease in the brightness of the fiber cloth in each color, as compared with Comparative Examples 1 to 3, which use the transparent synthetic resin adhesive.

REFERENCE SIGNS LIST

1, 1A, 1B Light- and heat-shielding composite sheet
2 Fiber cloth
3, 3A, 3B-1, 3B-2 Synthetic resin film
4 Synthetic resin adhesive

The invention claimed is:

1. A light- and heat-shielding composite sheet, consisting of:
   a fiber cloth;
   one layer of a synthetic resin film containing carbon black at a rate of 4% to 40% by mass both inclusive; and
   a synthetic resin adhesive layer containing titanium dioxide at a rate of 30% to 60% by mass both inclusive, wherein the synthetic resin adhesive layer is the only adhesive layer present, and contacts and bonds together the fiber cloth with the synthetic resin film.

2. The light- and heat-shielding composite sheet according to claim 1, wherein a brightness (L-value) of a surface of the fiber cloth is 95% or more of a brightness (L-value) of the fiber cloth alone without being bonded with the synthetic resin film.

3. The light- and heat-shielding composite sheet according to claim 1, wherein the synthetic resin film includes a polyurethane resin and has a thickness of 10 μm to 30 μm both inclusive.

4. The light- and heat-shielding composite sheet according to claim 1, wherein a dry application amount of the synthetic resin adhesive is 30 g/m² to 60 g/m² both inclusive.

5. The light- and heat-shielding composite sheet according to claim 1, wherein a light-shielding property according to JIS L1055 A method is 99.9% or more.

6. The light- and heat-shielding composite sheet according to claim 1, wherein the light- and heat-shielding composite sheet has a 7.7.7 heat-shielding index according to a JUPA standard of 40 or more.

7. A fiber product that incorporates the light- and heat-shielding composite sheet according to claim 1.

* * * * *